United States Patent Office 2,782,184
Patented Feb. 19, 1957

2,782,184

N,N-BIS(1,1 - DIHYDROPERFLUOROALKYL) ACYLAMIDES AND POLYMERS THEREOF

Donald R. Husted, St. Paul, and Arthur H. Ahlbrecht, White Bear Township, Ramsey County, Minn., assignors to Minnesota Mining & Manufacturing Company, St. Paul, Minn., a corporation of Delaware No Drawing. Application July 17, 1953,
Serial No. 368,825

7 Claims. (Cl. 260—89.7)

This invention relates to our discovery of new and useful reactive fluorocarbon compounds, some of which are polymerizable monomers, and to new and useful polymers of the latter.

These new compounds are N,N-bis(1,1 - dihydroperfluoroalkyl)acylamides, which have in the molecule a single nitrogen atom linked by means of two separate methylene groups to two terminal fluorocarbon groups, at least one of which provides a fluorocarbon chain or "tail," and this nitrogen atom is also bonded to an acyl group.

We have discovered that they can be readily prepared from the bis(1,1-dihydroperfluoroalkyl) amines, which are secondary amines represented by the generic formula:

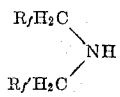

where $R_f$ and $R_f'$ are perfluoroalkyl groups (which can be the same or different) containing up to eleven carbon atoms, that is, fully fluorinated alkyl groups consisting solely of carbon and fluorine, having the formula $C_nF_{2n+1}$. At least one (and preferably both) of these perfluoroalkyl groups contains at least three carbon atoms, so that the molecule has a terminal fluorocarbon "tail" or "tails," and this is of critical importance. These fluorocarbon "tails" are non-polar, highly stable and inert, and both hydrophobic and oleophobic. Thus one of the perfluoroalkyl groups ($R_f$ and $R_f'$) contains from one to eleven carbon atoms and the other contains from three to eleven carbon atoms. These secondary amine starting compounds are believed to be novel with us and they (and their strong-acid salts) are claimed in our divisional application S. N. 439,454, filed June 25, 1954.

Our presently claimed N,N-bis(1,1-dihydroperfluoroalkyl) acylamides can be represented by the generic formula:

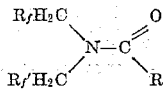

where $R_f$ and $R_f'$ have the same meaning defined above, and R is an aliphatic hydrocarbon or perfluoro alkyl group containing one to 17 carbon atoms, and which thus can be either a saturated or an olefinic hydrocarbon group. These compounds contain at least one fluorocarbon "tail" and have marked surface active properties. While in general it is preferred that the "R" group contain 1 to 6 carbon atoms, for some uses a long chain hydrocarbon group is desirable to impart special properties, such as increased solubility in oil.

The acylamide compounds that contain a hydrocarbon acrylamide or methacrylamide group are of especial interest because they provide reactive monomers which show great resistance to hydrolysis and which can be readily polymerized and copolymerized to form stable and useful high polymers having novel properties. The acrylamides have the formula:

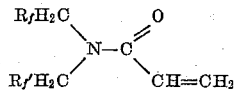

and the methacrylamides have the formula:

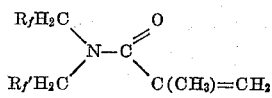

Polymers and copolymers of these monomers contain fluorocarbon "tails" that are exposed at the surface of coatings and articles. These "tails" are highly stable and inert, are non-polar, and are both oleophobic and hydrophobic.

Polymerization readily occurs at moderately elevated temperatures (50 to 100° C.) in the presence of a free radical chain starter such as a peroxide or persulfate catalyst (e. g., benzoyl peroxide or sodium or potassium persulfate).

The homopolymers show good chemical and thermal stability, and provide flexible and elastic films and coatings that are highly resistant to water, acids, gasoline, oils, greases, and many common organic solvents, and that are stable at elevated temperatures. Utility is indicated for gaskets and for linings for pipes and tanks.

In addition to homopolymers formed solely from our acrylamide and methacrylamide monomers (and heteropolymers formed by copolymerizing a mixture of an acrylamide and a methacrylamide), novel and useful heteropolymers can be made by copolymerizing a mixture of one or more of our monomers and one or more polymerizable monomers of other types which contain an ethylenic linkage (such as ethylene, styrene, acrylonitrile, butadiene, isoprene, vinyl ethers, vinyl esters, acrylates, methacrylates, acrylic acid, methacrylic acid, maleic anhydride, allyl alcohol, and halogenated derivatives of such monomers).

The present compounds are uniquely different in kind from corresponding compounds that contain only one or two carbon atoms in each of the fluorocarbon groups ($R_f$ and $R_f'$). The presence of at least three carbon atoms is essential to provide a perfluoro chain serving as a fluorocarbon "tail" capable of imparting the requisite solubility and surface active properties. It is of critical importance that each of the fluorocarbon groups be linked to the nitrogen atom by means of a single methylene group ($-CH_2-$). A hydrocarbon chain consisting of two or more hydrogenated carbon atoms, imparts too much of a hydrocarbon characteristic and spaces the fluorocarbon group too far from the nitrogen atom. It is also of critical importance that the terminal group be a trifluoromethyl group ($CF_3-$) and that the fluorocarbon chain or "tail" be free of hydrogen atoms. In particular, the presence of even one hydrogen atom on the last or next to last carbon atom of the "tail" will markedly alter the surface active and solubility properties, render the "tail" polar instead of non-polar, provide a point of attack for chemical reactions, and provide an opportunity for dehydrofluorination. However, a single "buried" methylene group ($-CH_2-$) linking the nitrogen atom to the fluorocarbon group, serves to impart desirable reaction characteristics and does not prevent the desired fluorocarbon properties when at least one of the methylene groups is united to a fluorocarbon "tail." In the preferred compounds, each methylene group links a fluorocarbon "tail" to the nitrogen atom; that is, each perfluoroalkyl group ($R_f$ and $R_f'$) contains 3 to 11 carbon atoms.

We have discovered that the present compounds can be made as follows:

The bis(1,1-dihydroperfluoroalkyl) amines used as starting compounds can be made by reduction of the corresponding diperfluoroacylamides, as by using lithium aluminum hydride as the reduction agent:

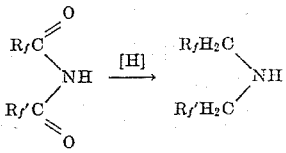

By reacting the amine product with the anhydride of a monocarboxylic acid, the corresponding N,N-bis(1,1-dihydroperfluoroalkyl) acylamide is formed and can be recovered:

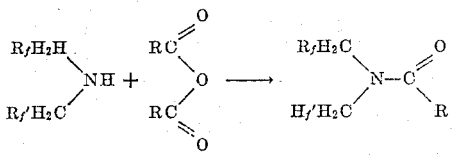

Instead of using the anhydride of the acid, use can be made of the acid chloride for preparing the amide product:

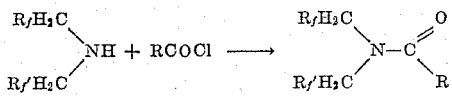

An amide product example which contains a long hydrocarbon chain is N,N-bis(1,1-dihydroperfluorobutyl) stearamide, made by reaction of stearoyl chloride with the corresponding amine.

When the anhydride or acid chloride of a perfluoroalkyl monocarboxylic acid is employed, the product compound will contain a perfluoro acyl group and will be a N,N-bis(1,1-dihydroperfluoroalkyl) perfluoroacylamide, as illustrated by the perfluorobutyramides:

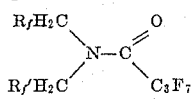

When the anhydride or acid chloride of acrylic acid or methacrylic acid is employed, the product compound will be an acrylamide or methacrylamide, respectively, and, as previously noted, these provide useful monomers.

The following experimental examples illustrate procedures for making the subject compounds and polymers and provide further data on their properties.

*Example 1*

This example illustrates the preparation of an amine starting compound having two $C_3F_7$ fluorocarbon tails and its conversion to various acylamide product compounds of the present invention.

The apparatus was a 3000 ml. 3-necked flask fitted with a reflux condenser, tight-sleeve stirrer, dropping funnel and gas inlet tube. The apparatus was dried overnight in a 125° C. oven and assembled while hot and with dry nitrogen flowing then and at all times thereafter to completely exclude air (oxygen); a ntirogen flow of 0.5–1 cubic feet per hour being maintained initially.

The flask was charged with 1000 ml. of anhydrous diethyl ether and then with 24 grams (0.63 mole) of lithium aluminum hydride, LiAlH₄, in finely powdered form, with constant stirring which resulted in the powder being fully dissolved in two hours. (This material should be ground and handled only under a nitrogen atmosphere.) The flask was then cooled in an ice bath and addition was made of a solution of 100 ml. of dry ether containing 62 grams of di-n-perfluorobutyramide:

The addition was made slowly at such rate as to maintain a gentle reflux of ether. Stirring was continued at room temperature for two hours. The flask was then cooled in a Dry Ice bath (mixture of solid-CO₂ and acetone) and 80 ml. (1.96 moles) of methyl alcohol was added to destroy the excess lithium aluminum hydride. (The dropping tube was arranged so that the alcohol would fall on the surface of the liquid and would not strike the wall of the flask where some unreacted LiAlH₄ may have been deposited, and ether was added to return the liquid to the original level or slightly higher. The use of explosion shields and remote control is recommended. An increase of nitrogen flow to a rate of at least 1 to 2 cubic feet per hour is desirable at this stage.)

Immediately afterwards, and with a nitrogen flow rate of 1 to 2 cubic feet per hour being maintained, addition was made of 45 ml. of a 50% solution of sodium hydroxide (0.85 mole NaOH) to hydrolyze the LiAlH₄ complex and liberate the secondary amine product compound. The resultant slurry was centrifuged, and ether layer removed, and the aqueous layer extracted three times with ether. The ether layer and ether extracts were combined and distilled. The fraction boiling at 137–139° C. (at 746.5 mm.) was redistilled to yield a fraction having a boiling point of 138.0–138.5° C. (at 735.5 mm.), identified as relatively pure normal N,N-bis(1,1-dihydroperfluorobutyl) amine:

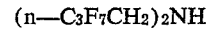

This liquid compound had a refractive index at 25° C. of 1.2965, and a density (grams/cc. at 20° C.) of 1.614. Analysis showed 69.6% fluorine (69.8% calc.) and 3.67% nitrogen (3.67% calc.).

This N,N-bis(1,1-dihydroperfluorobutyl) amine compound is only slightly soluble in water and in mineral oil. It is moderately soluble in commercial heptane, petroleum spirits, benzene and trifluoroethanol. It is soluble in acetone, ethyl alcohol, ether, carbon tetrachloride and chloroform.

A 50 ml. round-bottom flask, fitted with a reflux condenser, was charged with 10 grams (0.026 mole) of normal bis(1,1-dihydroperfluorobutyl) amine prepared as described above and 15 grams (0.0365 mole) of normal perfluorobutyric anhydride. The mixture was refluxed for 30 minutes and poured into cold water. The oily bottom layer (14 grams) was washed twice with 5% aqueous sodium bicarbonate solution, then once with water, and was distilled through a fractionating column having 6–10 theoretical plates. The fraction having a vacuum boiling point of 88.5–89.0° C. (at 18 mm.) was obtained in a 65% yield and was identified as relatively pure normal N,N-bis(1,1-dihydroperfluorobutyl) perfluorobutyramide:

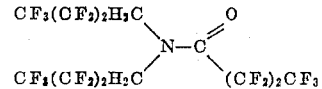

This compound was an oily liquid having a refractive index at 25° C. of 1.3065, and a density at 20° C. of 1.731. Analysis showed 67% fluorine (69.2% calc.) and 2.3% nitrogen (2.43% calc.). It will be noted that this compound has three fluorocarbon "tails" in the molecule, one being bonded to the carbon atom of the carbonyl group.

The acetamide derivative was similarly prepared by refluxing an equimolar mixture of the secondary amine and acetic anhydride for four hours. The oily bottom layer was washed three times with water, dried with anhydrous calcium sulfate, and distilled. The fraction having a micro boiling point of 142.5–143.0° C. (at 740 mm.) was identified as relatively pure normal N,N-bis(1,1-dihydroperfluorobutyl) acetamide:

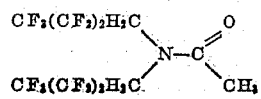

This compound was an oily liquid, having a refractive index at 20.4° C. of 1.3178 and at 25° C. of 1.3105. Analysis showed 27.4% carbon (28.38% calc.) and 3.25% nitrogen (3.31% calc.).

The acrylamide derivative was prepared by charging a flask (having a reflux condenser) with the secondary amine, containing a trace of hydroquinone to inhibit polymerization of the product, and adding dropwise an equimolar amount of acrylic anhydride. The flask was then shaken for 15 minutes at 50° C. and for 3¼ hours at room temperature. The reaction product was poured into cold water and the oil bottom layer was separated, washed with water and dried, and then purified by distillation in a high-vacuum short-path still. The fraction coming off up to 0° C. (at 0.01 mm.), and the fraction coming off at 0 to 25° C., were separately collected, the condenser being cooled with solid-$CO_2$. These fractions were separately distilled and the high-boiling product fractions were combined and redistilled. The final fraction was identified as relatively pure normal N,N-bis(1,1-dihydroperfluorobutyl) acrylamide:

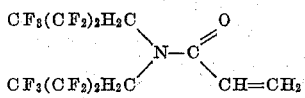

This compound was an oily liquid. Analysis showed 30.2% carbon (calc. 30.3%) and 3.21% nitrogen (calc. 3.22%).

*Example 2*

This example illustrates the preparation of homopolymers and copolymers, using the preferred monomer, which has just been described, namely, normal N,N-bis (1,1-dihydroperfluorobutyl) acrylamide, whose formula can be abbreviated as:

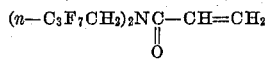

(A) This acrylamide monomer was polymerized by sealing in an evacuated ampoule with a trace of benzoyl peroxide catalyst, and gently heating up to about 50° C. for several minutes. The homopolymer product was a white solid that was elastic and somewhat rubbery, that was repellent both to water and to hydrocarbons, and that was not attacked by hot concentrated sulfuric acid.

(B) In one experiment an attempt was made at emulsion polymerization. The product was not a latex, owing to coagulation, but did provide a useful polymer mass. The following recipe was used:

| | Parts |
|---|---|
| Amide monomer | 100 |
| Water | 180 |
| "Duponol ME" | 3 |
| $Na_2S_2O_8$ (sodium persulfate catalyst) | 1 |
| $NaHSO_3$ | 0.5 |
| Borax | 0.5 |

(The "Duponol ME" is a well-known emulsifier of the sodium alkyl sulfate type and is a mixture of sodium salts of alkyl sulfonic acids derived from a mixture of higher alcohols, predominantly lauryl alcohol, and is sold by E. I. du Pont de Nemours & Co.). The sample was sealed under vacuum in an ampoule and was shaken at 50° C. for one hour. The solid polymer that had separated out was removed and washed with water. It was a white solid, somewhat rubbery, which formed flexible films. It was resistant to 30% sulfuric acid and showed no weight loss when refluxed in the acid for 45 minutes. It showed a 25% loss in weight, however, when it was refluxed for 45 minutes in 10% sodium hydroxide solution. This homopolymer was both hydrophobic and oleophobic (i. e., it was repellent to water and oils). It did not materially soften nor become tacky at temperatures up to about 195° C. It was found to be insoluble in fluorocarbons, toluene, isooctane, methyl perfluorobutyrate, diethyl ether, xylene hexafluoride, and benzotrifluoride. It was slightly soluble in carbon tetrachloride, butanone and chloroform. Analysis of this homopolymer showed 3.21% nitrogen (calc. 3.22%).

(C) An ampoule was evacuated and charged with 25 parts of the amide monomer, 3.1 parts of butadiene, and 0.5 part of benzoyl peroxide catalyst. The tube was shaken at 70° C. for 5½ hours. The resultant copolymer was a translucent solid showing slight rebounding or rubbery properties. It became more rubbery when heated and returned to its original shape even at 110° C. It became sticky at about 118° C. Analysis showed 2.90% nitrogen, indicating that this copolymer contained 53 mol percent of the fluorinated amide and 47% butadiene.

(D) Using the same procedure, a copolymer with styrene was made by heating a mixture of 25 parts of the amide, 6 parts of styrene, and 0.5 part of benzoyl peroxide. The copolymer was a clear transparent solid which softened at 98° C. and became tacky at 118° C.

(E) Using the same procedure, a copolymer with acrylonitrile was made by heating a mixture of 25 parts of the amide, 3 parts of acrylonitrile, and 0.5 part of benzoyl peroxide. The copolymer was a slightly yellow hard solid. It softened slightly at 152° C. and darkened slowly above 170° C.

(F) Using the same procedure, a copolymer with vinyl acetate was made by heating a mixture of 25 parts of the amide, 4.9 parts of vinyl acetate, and 0.5 part of benzoyl peroxide, but in this case the mixture was heated for only 2 hours. The copolymer was a white, somewhat flaky, solid which became tacky at 170° C. Analysis showed 34.1% carbon, which indicated that this copolymer contained 53 mol percent of the amide and 47% vinyl acetate.

*Example 3*

This example illustrates the preparation of the amides by using acid chlorides rather than acid anhydrides.

To 30 ml. of anhydrous ether in a 100 ml. flask were added 10 g. (.0258 mole) of N,N-bis(1,1-dihydroperfluorobutyl) amine and 2.7 g. (.027 mole) of anhydrous triethylamine. The solution was cooled in an ice bath and 2.33 g. (.0258 mole) of acrylyl chloride was slowly added dropwise while shaking the reaction flask. After the addition was complete the ether was evaporated off and the resulting oily suspension of solid was added to water. The water solution was made basic (pH 9–10) with 10% $Na_2CO_3$ and the resulting lower layer was washed again with water and then charged for vacuum distillation. From the charge of 5.5 g., 3 g. of product was collected boiling at 97–100° C. (at 21 mm.). This product was identified as relatively pure normal N,N-bis-(1,1-dihydroperfluorobutyl) acrylamide. It had a micro boiling point of about 170° C. (at 740 mm.), and a refractive index at 20° C. of 1.343. Analysis showed 3.19% nitrogen (calc. 3.22%) and no detectable chlorine.

*Example 4*

This example illustrates the preparation of long chain secondary amines used for making corresponding acylamide product compounds of the present invention.

The starting compound was diperfluorocapric amide:

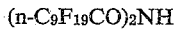

having a vacuum boiling point of 176–179° C. (at 7 mm.). It was reduced with lithium aluminum hydride and the secondary amine product derivative was recovered, by using a procedure similar to that described in "Example 1."

The product was identified as relatively pure normal bis(1,1-dihydroperfluorodecyl) amine:

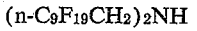

It was a white solid compound having a melting point of 85–86° C.

This amine can be used for making the corresponding acylamide and methacrylamide derivatives by reaction with acrylic or methacrylic acid anhydrides or acid chlorides in the manner previously described, and the acrylamide and methacrylamide derivatives can be polymerized to yield solid high polymers which are stable and are both hydrophobic and oleophobic.

*Preparation of the diperfluoroacylamine starting compounds.*—The previously described procedure for making the bis(1,1-dihydroperfluoroalkyl) amines involves reduction of corresponding diperfluoroacylamide starting compounds:

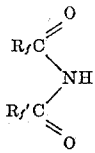

These starting compounds can be readily prepared by reacting primary fluorocarbon amides with fluorocarbon acid anhydrides:

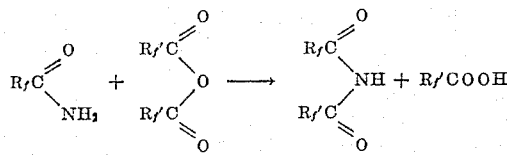

The reaction can be conveniently performed by refluxing the reactants and then separating the secondary amide derivative by fractional distillation. It will be noted that the $R_f$ and $R_f'$ groups of the product compounds will be different when the amide and anhydride reactants have correspondingly different fluorocarbon groups.

These diperfluoroacylamide compounds are described and claimed in the companion application of G. H. Smith, Serial No. 368,820, filed of even date herewith, now Patent No. 2,701,814. The primary amide starting compounds are described in the Diesslin, Kauck and Simons Patent No. 2,567,011 (Sept. 4, 1951).

We claim:
1. As new and useful reactive fluorocarbon compounds, the N,N-bis(1,1-dihydroperfluoroalkyl) acylamides having the formula:

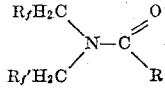

where $R_f$ and $R_f'$ are perfluoroalkyl groups, one of which contains 1 to 11 carbon atoms and the other contains 3 to 11 carbon atoms, and R is an aliphatic group containing 1 to 17 carbon atoms selected from the class consisting of hydrocarbon groups and perfluoroalkyl groups.

2. The N,N-bis(1,1-dihydroperfluoroalkyl) acylamide compounds having the formula:

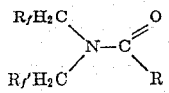

where $R_f$ and $R_f'$ are perfluoroalkyl groups that each contain 3 to 11 carbon atoms, and R is a perfluoroalkyl group containing 1 to 6 carbon atoms.

3. The normal N,N-bis(1,1-dihydroperfluorobutyl) perfluorobutyramide compound having the formula:

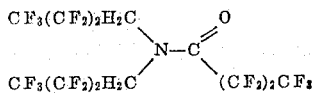

4. The N,N-bis(1,1-dihydroperfluoroalkyl) acrylamide compounds having the formula:

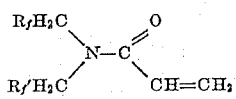

where $R_f$ and $R_f'$ are perfluoroalkyl groups, one of which contains 1 to 11 carbon atoms and the other contains 3 to 11 carbon atoms.

5. The normal N,N-bis(1,1-dihydroperfluorobutyl) acrylamide compound having the formula:

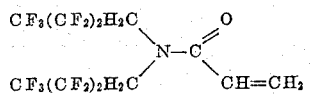

6. Polymers of the compounds of claim 4.
7. Polymers of the compound of claim 5.

References Cited in the file of this patent
UNITED STATES PATENTS

| | | |
|---|---|---|
| 2,521,902 | Coover et al. | Sept. 12, 1950 |
| 2,559,752 | Berry | July 10, 1951 |

OTHER REFERENCES

Bourne et al.: "J. Chem. Soc." (London), October 1952, pp. 4014–19.